US011829337B2

(12) United States Patent
Kurz et al.

(10) Patent No.: US 11,829,337 B2
(45) Date of Patent: Nov. 28, 2023

(54) MINIMIZING DOWNTIME IN MIGRATING CONTENT OF DATABASES SYSTEMS

(71) Applicant: SAP SE, Walldorf (DE)

(72) Inventors: Saskia Kurz, Berlin (DE); Alexander Schroeder, Berlin (DE); Thomas Loetzer, Berlin (DE); Marco Paskamp, Stendal (DE); Kerstin Welk, Berlin (DE); Martin Fei, Berlin (DE); Enno Folkerts, Heidelberg (DE); Christoph Bautz, Berlin (DE); Tilo Heinrich, Leonberg (DE)

(73) Assignee: SAP SE, Walldorf (DE)

( * ) Notice: Subject to any disclaimer, the term of this patent is extended or adjusted under 35 U.S.C. 154(b) by 1174 days.

(21) Appl. No.: 15/352,987

(22) Filed: Nov. 16, 2016

(65) Prior Publication Data

US 2018/0137113 A1   May 17, 2018

(51) Int. Cl.
*G06F 16/20* (2019.01)
*G06F 16/21* (2019.01)
*H04L 67/10* (2022.01)

(52) U.S. Cl.
CPC .......... *G06F 16/214* (2019.01); *H04L 67/10* (2013.01)

(58) Field of Classification Search
CPC ............................ G06F 17/303; G06F 16/214
See application file for complete search history.

(56) References Cited

U.S. PATENT DOCUMENTS

| | | | |
|---|---|---|---|
| 8,121,874 B1* | 2/2012 | Guheen | G06Q 10/063 705/7.11 |
| 8,700,660 B2 | 4/2014 | Lee et al. | |
| 8,793,276 B2 | 7/2014 | Lee et al. | |
| 9,067,677 B2 | 5/2015 | Lee et al. | |
| 9,110,601 B2 | 8/2015 | Vorsprach et al. | |
| 9,201,606 B1* | 12/2015 | Taylor | G06F 3/0647 |
| 9,336,284 B2 | 5/2016 | Lee et al. | |
| 2004/0111726 A1* | 6/2004 | Dilley, Jr. | G06F 16/214 719/310 |
| 2009/0007106 A1* | 1/2009 | Araujo, Jr. | G06F 9/54 718/1 |
| 2012/0124081 A1* | 5/2012 | Ebrahimi | G06F 16/214 707/769 |
| 2014/0129269 A1 | 5/2014 | Rey et al. | |
| 2014/0143263 A1* | 5/2014 | Ritter | G06F 17/30303 707/756 |

(Continued)

*Primary Examiner* — Tarek Chbouki
*Assistant Examiner* — Loan T Nguyen
(74) *Attorney, Agent, or Firm* — Fish & Richardson P.C.

(57) ABSTRACT

Methods, systems, and computer-readable storage media for executing a first application on a source system during production use of the source system, providing a second application on a target system, during the production use of the source system: migrating data from the source system to the target system based on a catalog delta, and a data delta, each of the catalog delta, and the data delta being periodically determined, and determining whether a completion time exceeds a threshold time, the completion time being determined based on a last-determined data delta, and, in response to determining that the completion time does not exceed the threshold time: halting production use of the source system, and completing migration to the target system based on the last-determined data delta.

20 Claims, 3 Drawing Sheets

(56) References Cited

U.S. PATENT DOCUMENTS

| | | | |
|---|---|---|---|
| 2015/0301848 A1* | 10/2015 | Roehrig | G06F 9/45558 718/1 |
| 2015/0363458 A1* | 12/2015 | Cline | G06F 17/303 707/638 |
| 2016/0098323 A1* | 4/2016 | Mutha | G06F 11/1402 707/654 |

* cited by examiner

MINIMIZING DOWNTIME IN MIGRATING CONTENT OF DATABASES SYSTEMS

BACKGROUND

Entities, such as software developers and/or vendors, provide software and services. Example software can include enterprise software. In some examples, enterprise software can include application software (an application) that interacts with one or more databases. For example, an application can be hosted on one or more application servers and a user can interact with the application using a client device. In some examples, user interaction can result in data being read from, written to, and/or modified within one or more databases.

Enterprise software is executed on hardware, which includes processors, memory, and the like. In some examples, the enterprise software is optimized for the particular hardware platform that it is to be executed on. For example, the hardware platform can have a particular configuration (e.g., processor type, architecture, endianness) that is distinct from another hardware platform's configuration. Consequently, if software and data is to be migrated from the hardware platform to the other hardware platform, significant downtime may be required to achieve the migration, which adversely effects production use of the software and data. For example, extended downtime can negatively impact an enterprises ability to meet system availability obligations of one or more service level agreements (SLAs).

SUMMARY

Implementations of the present disclosure include computer-implemented methods for minimizing downtime during migration of database systems. In some implementations, actions include executing a first application on a source system during production use of the source system, providing a second application on a target system, during the production use of the source system: migrating data from the source system to the target system based on a catalog delta, and a data delta, each of the catalog delta, and the data delta being periodically determined, and determining whether a completion time exceeds a threshold time, the completion time being determined based on a last-determined data delta, and, in response to determining that the completion time does not exceed the threshold time: halting production use of the source system, and completing migration to the target system based on the last-determined data delta. Other implementations of this aspect include corresponding systems, apparatus, and computer programs, configured to perform the actions of the methods, encoded on computer storage devices.

These and other implementations can each optionally include one or more of the following features: the catalog delta provides one or more differences between a database catalog of the source system, and a database catalog of the target system; the data delta provides one or more differences between data stored in a database of the source system, and data stored in a database of the target system; completing migration to the target system based on the last-determined data delta includes: migrating data of the source system indicated by the last-determined data delta to the target system, determining a final catalog delta, and executing one or more final extraction steps that are provided based on the final catalog delta; completing migration to the target system based on the last-determined data delta further includes applying updates indicated by the last-determined data delta to data stored in the target system; the completion time is determined based on one or more of data of the source system to-be-migrated to the target system, and at least one update to data stored in the target system, as indicated by the last-determined data delta; and actions further include using the target system for production use of the second application after completion of the migration.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to minimizing downtime during migration of database systems. In some implementations, near-zero downtime is achieved to provide almost continuous availability of data and functions during migration between database systems. In some implementations, actions include executing a first application on a source system during production use of the source system, providing a second application on a target system, during the production use of the source system: migrating data from the source system to the target system based on a catalog delta, and a data delta, each of the catalog delta, and the data delta being periodically determined, and determining whether a completion time exceeds a threshold time, the completion time being determined based on a last-determined data delta, and, in response to determining that the completion time does not exceed the threshold time: halting production use of the source system, and completing migration to the target system based on the last-determined data delta.

Figure 1:
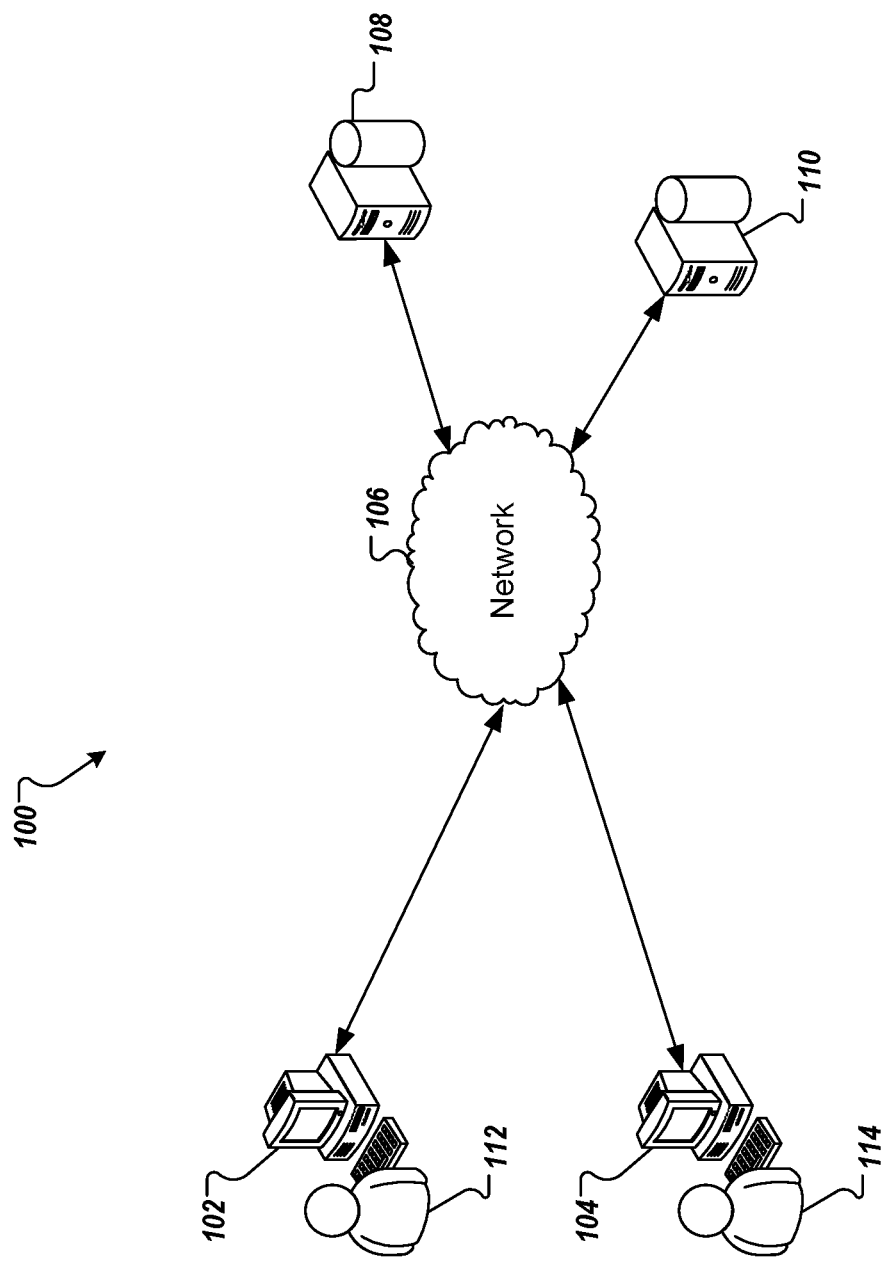
FIG. 1 depicts an example high-level architecture in accordance with implementations of the present disclosure.

FIG. 1 depicts an example architecture 100 in accordance with implementations of the present disclosure. In the depicted example, the example architecture 100 includes one or more client devices 102, 104, server systems 108, 110, and a network 106. The server systems 108, 110 include one or more server devices and databases (e.g., processors, memory). In the context of the present disclosure, the server systems 108, 110 are respective hardware platforms. In the depicted example, respective users 112, 114 interact with the client devices 102, 104. In an example context, the user 112 can include a user (e.g., customer), who interacts with an application that is hosted by the server system 108. In an example context, the user 108 can include a user (e.g., administrator), who interacts with the server systems 108, 110 to perform migration of database systems, as described in further detail herein.

In some examples, the client devices 102, 104 can communicate with one or more of the server systems 108, 110 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server system 108, 110 includes at least one server and at least one data store. In the example of FIG. 1, the server systems 108, 110 are intended to represent various forms of servers including, but not limited to a web server, an application server, a proxy server, a network server, and/or a server pool. In general, server systems accept requests for application services and provides such services to any number of client devices (e.g., the client devices 102, 104 over the network 106).

In some implementations, one or more data stores of the server systems 108, 110 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. An example in-memory database system includes SAP HANA provided by SAP SE of Walldorf, Germany.

Implementations of the present disclosure are described in further detail herein with reference to an example context. The example context includes an enterprise application that is executed in a client-server architecture, such as the example architecture 100 of FIG. 1. In some examples, an enterprise application can be provided in a suite that includes two or more enterprise applications. Example enterprise applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications).

Referring again to FIG. 1, and in the example context, one or more enterprise applications can be hosted by the server system 108. The user 112 can interact with an enterprise application using the client device 102. More specifically, a session can be established between the client device 102 and the server system 108, during which session the user 112 is able to interact with one or more enterprise applications hosted on the server system 108. The one or more enterprise applications can enable the user 112 to interact with data stored in one or more databases. In some examples, interactions can result in data being stored to the database, deleted from the database, and/or edited within the database. In some examples, interactions can result in one or more tables being added to, deleted from, and/or modified (e.g., table structure changed) within the database.

In the context of the present disclosure, the enterprise application, and database(s) are optimized for execution of the particular hardware configuration of the server system 108. For example, the hardware configuration of the server system 108 includes a respective processor architecture and/or endianness (i.e., the order of the bytes that make up a digital word in computer memory). In some examples, it can be determined to migrate the enterprise application, and database(s) to a new server system. For example, it can be determined to migrate the enterprise application, and database(s) from the server system 108 to the server system 110. In the context of the present disclosure, the server system 110 includes a respective hardware configuration that is different than that of the server system 108. For example, the processor architecture and/or endianness of the server system 110 is different than that of the server system 108.

As introduced above, migration between database systems results in downtime (e.g., unavailability) of an application and/or database. Although traditional migration processes exist, which achieve near-zero downtime, such processes are not optimal in cases where the migration occurs between hardware platforms having different hardware configurations. For example, system replication cannot be used in migration between hardware platforms having different hardware configurations, due to binary incompatibility of the data. Although there may be potential to use a traditional migration process, this would result in extended downtime, and not allow for a seamless switch-over to the new hardware platform.

In view of this context, implementations of the present disclosure enable near-zero downtime during migration between distinct hardware platforms. That is, implementations of the present disclosure provide enable downtime to be minimized, when migrating an enterprise application, and respective database(s) from a first hardware platform (e.g., the server system 108 of FIG. 1) to a second hardware platform (e.g., the server system 108 of FIG. 1).

In some implementations, a source system can include one or more enterprise applications, and one or more databases, which are executed on a first hardware platform. A target system can include one or more enterprise applications, and one or more databases, which are to be executed on a second hardware platform. Production data is migrated from the source system to the target system. In some examples, production data includes data stored in one or more database systems of the source system, which data is used by users (e.g., customers) during real-world, productive use of the target system (e.g., employees of an enterprise using an ERP application).

An example migration process of the present disclosure includes setting up the target system, setting up an instance of a data migration agent, invoking a migration command, monitoring the migration progress, finalizing the migration, and switching the target system to production. Each of these is described in further detail herein.

In some implementations, setting up the target system includes installing and configuring an enterprise application and corresponding database system(s) on the new hardware platform. For example, an ERP application and corresponding database system(s) are executing on the source system on a first hardware platform (e.g., the server system 108 of FIG. 1). The source system is in production, such that users (e.g., the user 112) are making real-world, productive use of the source system. The ERP application and the corresponding database system(s) are installed on the second hardware platform (e.g., the server system 110 of FIG. 1), thereby providing the target system. At this stage, the target system is not in production, and the target system can be considered empty, as no production data has been migrated to the target system.

In some implementations, a data migration agent is set-up. In some examples, a data migration agent is provided as one or more computer-executable programs that execute or assist with migration of production data from the source system to the target system. An example data migration agent includes the SAP HANA Smart Data Integration Agent provided by SAP SE of Walldorf, Germany.

In some implementations, the data migration process is initiated. For example, a migration command of the data migration agent is invoked. In response, general catalog data is migrated from the source system to the target system. For example, the general catalog data is copied from the source system and is stored in the target system. In some implementations, a snapshot of the database catalog (catalog snapshot) is read, which contains information on database objects. Example database objects include, without limitation, tables, views, users, and roles. The database objects are replicated in the target system, resulting in an exact replica of the database catalog being stored in the target system at the time of the catalog snapshot.

In some examples, the database catalog includes sensitive data (e.g., data used to authenticate users). Consequently, implementations of the present disclosure ensure the authenticity of the catalog data being replicated in the target system. In some implementations, a remote data source is created in the target system, which establishes a secure connection to the source system. This functionality can be provided by the data migration agent. In some examples, a command is invoked on the target system, which receives the name of the remote data source. In some examples, the command is executed to collect the catalog data through the remote data source, and store the catalog data in the target system.

In some implementations, all tables in the source system are registered for change data capture, and an initial load of data into the target system is performed. In some examples, for each database table of the source system, a change data capture (CDC) (e.g., a feature of the data migration agent) is registered. In some examples, a CDC is a function that alerts in response to, and records changes to data. For example, if a value of data is change from a first value to a second value, the CDC alerts to and records the change.

In some implementations, the database content of the source system is uploaded into the target system as an initial upload (e.g., content of the tables of the source system is copied to respective tables of the target system). In some examples, the initial upload serves as a baseline for the data replication performed during the migration process. For example, a content snapshot can be taken at the time of the initial upload. In some implementations, actions are taken, such that an impact of the initial upload on the source system is minimized. Example actions include selecting overall parallelism to balance CPU load on the source system versus time needed for the upload, selecting the size of data to be uploaded in individual sub-steps to reduce memory load on the source system and the target system, and, if a source table is partitioned, the data load takes this partitioning into account and uploads data by partition. It is contemplated that the initial upload occurs during production use of the source system. Consequently, minimizing impact on the source system is desired.

In some implementations, upon triggering of the initial upload, a snapshot of the database catalog of the source system is taken, and is compared to the previously recorded snapshot of the database catalog to determine a difference therebetween (e.g., catalog delta). If there is a catalog delta, the database catalog of the target system is updated based on the catalog delta to reflect the current state of the database catalog of the source system. For example, a comparison between a previously recorded snapshot of the database catalog, and a current snapshot of the database catalog can reveal that a new user and respective user credentials were added to the database catalog of the source system since the previously recorded snapshot. Consequently, the catalog delta can include data indicating the added user (e.g., username, password, role, etc.). The database catalog of the target system can be updated to include the new user. As another example, a comparison between a previously recorded snapshot of the database catalog, and a current snapshot of the database catalog can reveal that a user and respective user credentials were deleted from the database catalog of the source system since the previously recorded snapshot. Consequently, the catalog delta can include data indicating the deleted user (e.g., username, password, role, etc.). The database catalog of the target system can be updated to delete the user.

In some implementations, the database catalog of the target system is updated by determining the catalog delta, identifying change commands to be executed based on the catalog delta, and executing the change commands to recreate the same state for the database catalog in the target system. In some examples, a change command can include one or more steps that are performed to affect the change. In some examples, a catalog object does not include a data container (e.g., a class or a data structure that stores other data objects). In some examples, a catalog object can include one or more data containers. For example, a table can be provided as a catalog object that includes one or more data containers.

In some implementations, in executing a change command, special consideration may be required for handling catalog objects with data containers. In the examples case of a table, deletion of a table, addition of a table, and structural alterations to a table need to be accounted for. With respect to deletion of a table, the table is wholly unregistered from the migration. For example, if the catalog delta indicates that a table ACCOUNT was deleted from the database catalog of the source system, a change command is executed to delete the corresponding table ACCOUNT from the database catalog of the target system. With respect to addition of a table, a new table is registered for the migration. For example, if the catalog delta indicates that a table ACCOUNT was added to the database catalog of the source system, a change command is executed to add a corresponding table ACCOUNT to the database catalog of the target system, to register the table ACCOUNT for data change capture, and add the table ACCOUNT to the tables to be processed during the data migration. With respect to structural modification of a table, the table is unregistered from the migration (as with a deleted table as described above), and a new table is registered for the migration (as with an added table as described above). For example, if the catalog delta indicates that a table ACCOUNT was structurally altered (e.g., a column added/deleted) within the source system, a change command is executed to delete the corresponding table ACCOUNT from the database catalog of the target system, to add a new table ACCOUNT to the database catalog of the target system, which new table has the same structure as that of the corresponding table in the source system, to register the table ACCOUNT for data change capture, and to add the table ACCOUNT to the tables to be processed during the data migration.

Implementations of the present disclosure further include monitoring the progress of data migration from the source system to the target system. In some implementations, an amount of remaining data to be migrated is monitored, and downtime is initiated to complete the migration. As described in further detail herein, the time, at which the downtime is initiated is determined to minimize the duration of the downtime required to complete the migration, and switch the target system into production.

In some implementations, the data migration progress is monitored by periodically comparing the data of the source system to the data of the target system to determine a difference therebetween (e.g., data delta). In some examples, the data delta indicates, for a respective period of time, data of the source system that has not yet been migrated to the target system (e.g., data to be migrated to the target system), and/or data of the source system that has been migrated to the target system, but has changed in the source system (e.g., data to be updated in the target system).

In some implementations, a time for completion ($t_C$) is determined based on each data delta. In some examples, $t_C$ is determined based on an amount of data that is left to be migrated, and/or updates to data in the target system, as indicated by the data delta. In some examples, a data migration rate ($r_{MIG}$) can be provided, and can indicate a rate (e.g., in terms of memory (kB, GB, TB, etc.) per time (second, minute, hour, etc.)), at which data is migrated from the source system to the target system. In some examples, $r_{MIG}$ can be provided as an average rate based on the migration progress (e.g., if the migration has progressed over 72 hours, and 3 TB of data has been migrated, $r_{MIG}$ can be determined to be approximately 0.4 TB/hour). Accordingly, $r_{MIG}$ can vary over time. In some examples, $r_{MIG}$ is capped, such that it cannot exceed a maximum rate. In this manner, the data migration can be throttled to avoid adverse effects on production use of the source system during migration. In some implementations, a data transfer time ($t_T$) can be determined based on the amount of data that is left to be migrated, and $r_{MIG}$. For example, $t_T$ can be determined as a product of the amount of data that is left to be migrated, and $r_{MIG}$.

In some implementations, a data update time ($t_U$) can be determined based on one or more updates to data indicated by the data delta. In some examples, a plurality of update types can be provided, and each updated type associated with a respective time required to perform the update. For example, a first update type can include changing a data value, and can be associated with a first time, and a second update type can include deleting a data value, and can be associated with a second time. In some examples, $t_U$ is determined as a sum of the times required to perform each of the updates indicated in the data delta.

In some implementations, $t_C$ is determined as the sum of $t_T$ and $t_U$.

In some implementations, $t_C$ is compared to a threshold time ($t_{THR}$) to determine whether the source system is to be brought offline (e.g., production use suspended) to complete the migration. In some examples, $t_{THR}$ is selected to minimize an impact on production use of the enterprise application, while migration is completed. In some examples, $t_{THR}$ can vary. For example, a value for $t_{THR}$ can change depending on a time of day. For example, production use of the source system can vary over time (e.g., at 1 AM, few users access the source system, but at 9 AM user access spikes). In some examples, if $t_C$ is determined at a first time (e.g., 1 AM), a first value is provided for $t_{THR}$ (e.g., 7 hours), and if $t_C$ is determined at a second time (e.g., 5 AM), a first value is provided for $t_{THR}$ (e.g., 3 hours).

In some examples, if $t_C$ exceeds $t_{THR}$, the migration process continues. In some examples, if $t_C$ does not exceed $t_{THR}$, the source system is brought offline, and the migration process is completed. The enterprise application(s) on the source system are made unavailable for production use, and the data transfer, and/or data updates of the data delta (based upon which $t_C$ was determined) are performed (e.g., the data delta converges to zero).

In some implementations, a catalog delta is determined to identify one or more final extraction steps to complete the migration. In some examples, the one or more final extraction steps are executed, such that a state of the target system becomes the same as that of the source system. In some examples, final extraction steps can address issues that are unable to be addressed during production use of the source system. For example, sequence objects encapsulate a database-wide counter, which can only be captured, if the source system is out of production use. Accordingly, the catalog delta determined after the source system is taken out of production use can account for sequence objects.

After execution of the final extraction step(s), customer access is switched from the source system to the target system, and the target system is brought-online for subsequent production use.

Figure 2:
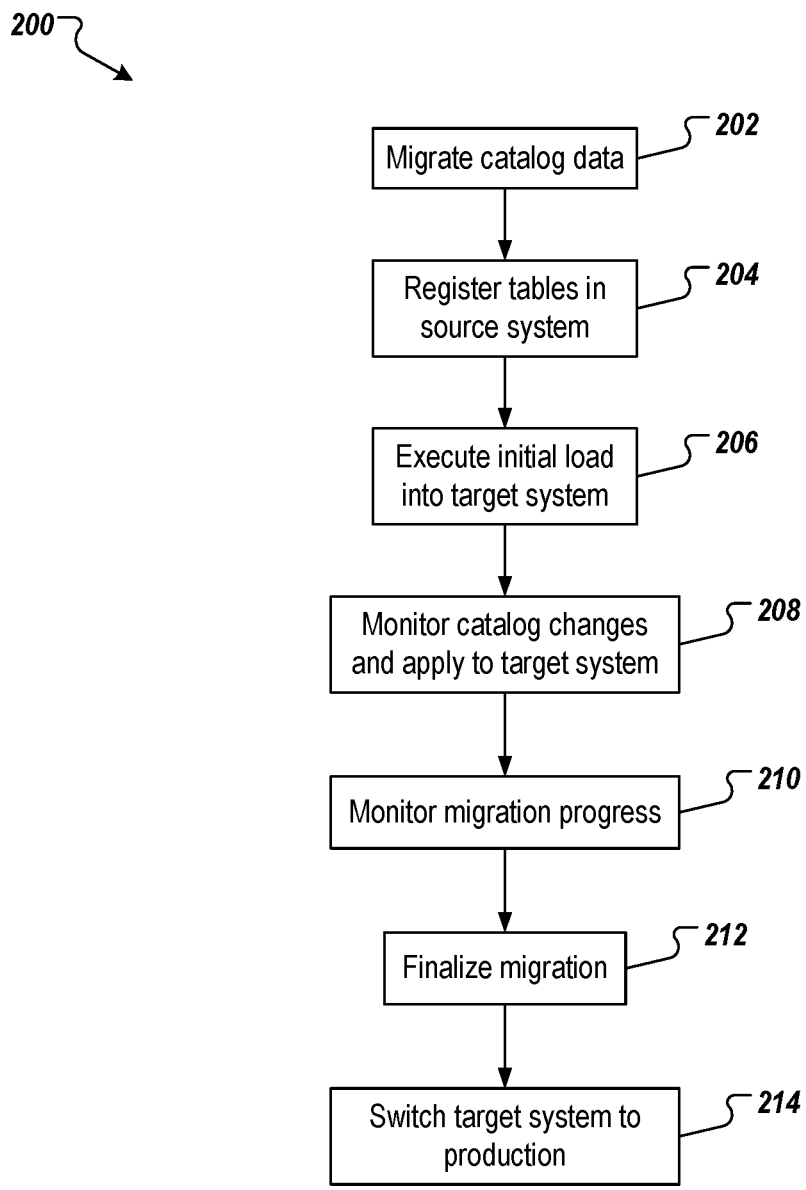
FIG. 2 depicts an example process that can be executed in accordance with implementations of the present disclosure.

FIG. 2 depicts an example process 200 that can be executed in accordance with implementations of the present disclosure. In some examples, the example process 200 can be provided by one or more computer-executable programs executed using one or more computing devices. In some implementations, the example process 200 is performed to minimize downtime during migration from a source system to a target system.

Catalog data is migrated (202). For example, general catalog data is copied from the source system and is stored in the target system. In some implementations, a snapshot of the database catalog (catalog snapshot) is read, which contains information on database objects. Example database objects include, without limitation, tables, views, users, and roles. The database objects are replicated in the target system, resulting in an exact replica of the database catalog being stored in the target system at the time of the catalog snapshot.

One or more tables in the source system are registered (204). For example, tables in the source system are registered for change data capture. In some examples, for each database table of the source system, a change data capture (CDC) (e.g., a feature of the data migration agent) is registered. In some examples, a CDC is a function that alerts in response to, and records changes to data. For example, if a value of data is change from a first value to a second value, the CDC alerts to and records the change.

An initial load into the target system is executed (206). For example, and as described herein, the database content of the source system is uploaded into the target system as an initial upload (e.g., content of the tables of the source system is copied to respective tables of the target system). In some examples, the initial upload serves as a baseline for the data replication performed during the migration process.

Catalog changes are monitored and are applied to the target system (208). For example, a snapshot of the database catalog of the source system is taken, and is compared to the previously recorded snapshot of the database catalog to determine a difference therebetween (e.g., catalog delta). If there is a catalog delta, the database catalog of the target system is updated based on the catalog delta to reflect the current state of the database catalog of the source system. In some implementations, the database catalog of the target system is updated by determining the catalog delta, identifying change commands to be executed based on the catalog delta, and executing the change commands to recreate the same state for the database catalog in the target system.

A progress of the migration is monitored (210). For example, an amount of remaining data to be migrated is monitored, and downtime is initiated to complete the migration. As described in further detail herein, the time, at which the downtime is initiated is determined to minimize the duration of the downtime required to complete the migration, and switch the target system into production. As described in detail herein, a time for completion ($t_C$) is periodically determined, and is compared to a threshold time ($t_{THR}$) to determine whether the source system is to be brought offline (e.g., production use suspended) to complete the migration.

The migration is finalized (212). For example, if $t_C$ does not exceed $t_{THR}$, the migration is finalized. In some examples, finalization of the migration includes bringing the source system offline, and completing the migration process. The enterprise application(s) on the source system are made unavailable for production use, and the data transfer, and/or data updates of the data delta (based upon which $t_C$ was determined) are performed (e.g., the data delta converges to zero). As described herein, a catalog delta (final catalog delta) is determined to identify one or more final extraction steps to complete the migration. In some examples, the one or more final extraction steps are executed, such that a state of the target system becomes the same as that of the source system.

The target system is switched into production use (214). For example, after execution of the final extraction step(s), customer access is switched from the source system to the target system, and the target system is brought-online for subsequent production use. Accordingly, users (e.g., customers) interact with the application using hosted on the target system instead of the source system. It can be noted that the target system becomes the source system for subsequent migration processes.

Figure 3:
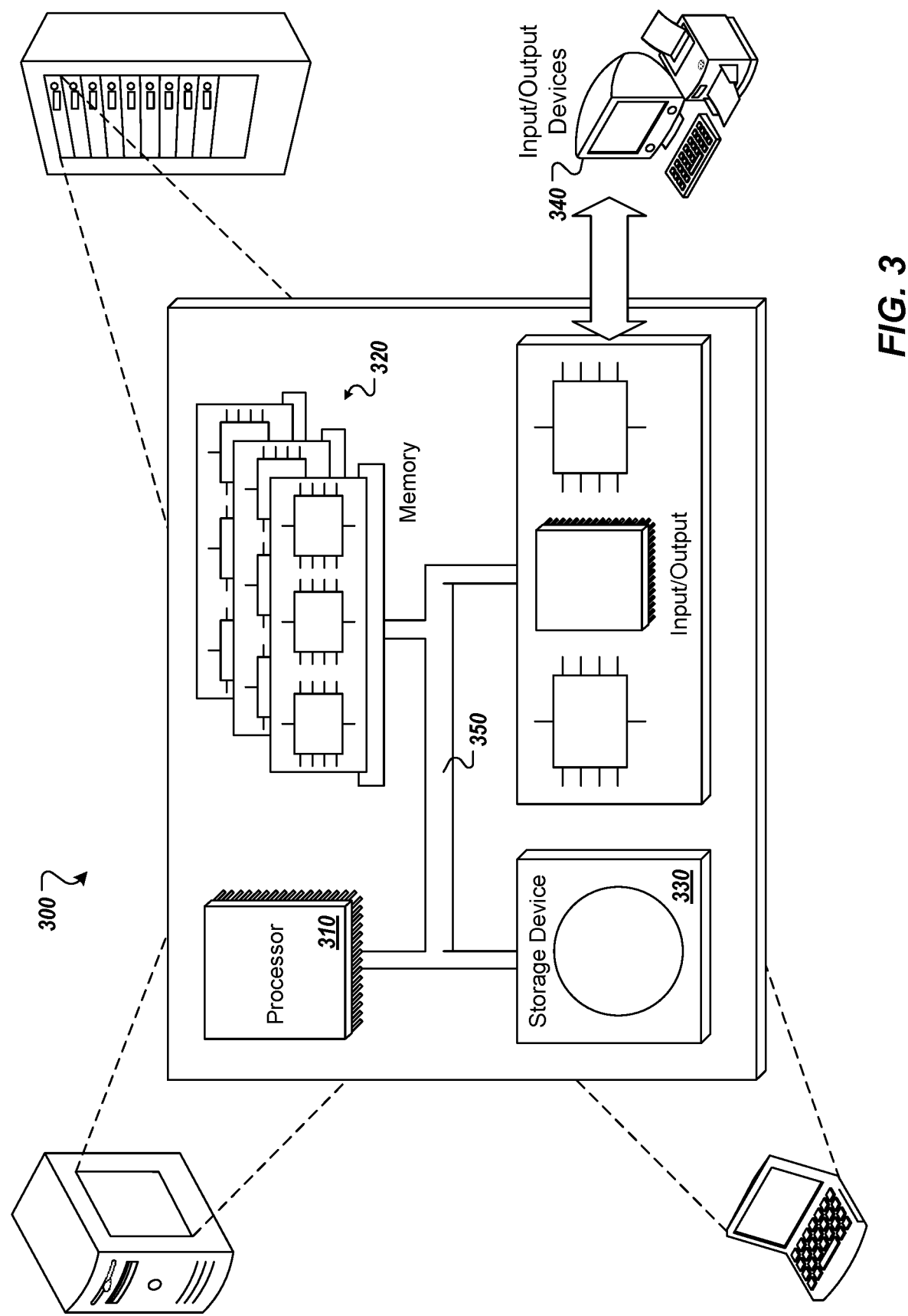
FIG. 3 is a schematic illustration of example computer systems that can be used to execute implementations of the present disclosure.

Referring now to FIG. 3, a schematic diagram of an example computing system 300 is provided. The system 300 can be used for the operations described in association with the implementations described herein. For example, the system 300 may be included in any or all of the server components discussed herein. The system 300 includes a processor 310, a memory 320, a storage device 330, and an input/output device 340. The components 310, 320, 330, 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit. The storage device 330 is capable of providing mass storage for the system 300. In one implementation, the storage device 330 is a computer-readable medium. In various different implementations, the storage device 330 may be a floppy disk device, a hard disk device, an optical disk device, or a tape device. The input/output device 340 provides input/output operations for the system 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for minimizing downtime during migration from a source system to a target system, the method being executed using one or more processors and comprising:
   executing a first application on the source system during production use of the source system, the source system having a first hardware configuration;
   providing a second application on the target system, the target system having a second hardware configuration that is different from the first hardware configuration resulting in binary incompatibility of data between the source system and the target system;
   during the production use of the source system:
      migrating data from the source system to the target system based on a catalog delta, and a data delta, each of the catalog delta, and the data delta being periodically determined,
      calculating a completion time based on a data transfer time and a data update time, the data transfer time being determined based on the data delta and a data migration rate, the data delta indicating an amount of data that is left to be transferred to the target system since a previous period, and the data migration rate comprising an average rate at which data has been migrated from the source system to the target system, the data update time being determined based on the data delta, and
      determining whether the completion time exceeds a threshold time, the threshold time varying based on a time at which the completion time is calculated; and
   in response to determining that the completion time does not exceed the threshold time:
      halting production use of the source system, and
      completing migration to the target system based on the data delta.

2. The method of claim 1, wherein the catalog delta provides one or more differences between a database catalog of the source system, and a database catalog of the target system.

3. The method of claim 1, wherein the data delta provides one or more differences between data stored in a database of the source system, and data stored in a database of the target system.

4. The method of claim 1, wherein completing migration to the target system based on the data delta comprises:
   migrating data of the source system indicated by the data delta to the target system;
   determining a final catalog delta; and
   executing one or more final extraction steps that are provided based on the final catalog delta.

5. The method of claim 4, wherein completing migration to the target system based on the data delta further comprises applying updates indicated by the data delta to data stored in the target system.

6. The method of claim 1, wherein the completion time is determined based on one or more of data of the source system, and at least one update to data stored in the target system, as indicated by the data delta.

7. The method of claim 1, further comprising using the target system for production use of the second application after completion of the migration.

8. A non-transitory computer-readable storage medium coupled to one or more processors and having instructions stored thereon which, when executed by the one or more processors, cause the one or more processors to perform operations for minimizing downtime during migration from a source system to a target system, the operations comprising:
   executing a first application on the source system during production use of the source system, the source system having a first hardware configuration;
   providing a second application on the target system, the target system having a second hardware configuration that is different from the first hardware configuration resulting in binary incompatibility of data between the source system and the target system;
   during the production use of the source system:
      migrating data from the source system to the target system based on a catalog delta, and a data delta, each of the catalog delta, and the data delta being periodically determined,
      calculating a completion time based on a data transfer time and a data update time, the data transfer time being determined based on the data delta and a data migration rate, the data delta indicating an amount of data that is left to be transferred to the target system since a previous period, and the data migration rate comprising an average rate at which data has been migrated from the source system to the target system, the data update time being determined based on the data delta, and determining whether the completion time exceeds a threshold time, the threshold time varying based on a time at which the completion time is calculated; and in response to determining that the completion time does not exceed the threshold time:
halting production use of the source system, and
completing migration to the target system based on the data delta.

9. The computer-readable storage medium of claim 8, wherein the catalog delta provides one or more differences between a database catalog of the source system, and a database catalog of the target system.

10. The computer-readable storage medium of claim 8, wherein the data delta provides one or more differences between data stored in a database of the source system, and data stored in a database of the target system.

11. The computer-readable storage medium of claim 8, wherein completing migration to the target system based on the data delta comprises:
migrating data of the source system indicated by the data delta to the target system;
determining a final catalog delta; and
executing one or more final extraction steps that are provided based on the final catalog delta.

12. The computer-readable storage medium of claim 11, wherein completing migration to the target system based on the data delta further comprises applying updates indicated by the data delta to data stored in the target system.

13. The computer-readable storage medium of claim 8, wherein the completion time is determined based on one or more of data of the source system, and at least one update to data stored in the target system, as indicated by the data delta.

14. The computer-readable storage medium of claim 8, wherein operations further comprise using the target system for production use of the second application after completion of the migration.

15. A system, comprising:
a computing device; and
a computer-readable storage device coupled to the computing device and having instructions stored thereon which, when executed by the computing device, cause the computing device to perform operations for minimizing downtime during maintenance procedures to an application, the operations comprising:

executing a first application on the source system during production use of the source system, the source system having a first hardware configuration;
providing a second application on the target system, the target system having a second hardware configuration that is different from the first hardware configuration resulting in binary incompatibility of data between the source system and the target system;
during the production use of the source system:
migrating data from the source system to the target system based on a catalog delta, and a data delta, each of the catalog delta, and the data delta being periodically determined,
calculating a completion time based on a data transfer time and a data update time, the data transfer time being determined based on the data delta and a data migration rate, the data delta indicating an amount of data that is left to be transferred to the target system since a previous period, and the data migration rate comprising an average rate at which data has been migrated from the source system to the target system, the data update time being determined based on the data delta, and
determining whether the completion time exceeds a threshold time, the threshold time varying based on a time at which the completion time is calculated; and
in response to determining that the completion time does not exceed the threshold time:
halting production use of the source system, and
completing migration to the target system based on the data delta.

16. The system of claim 15, wherein the catalog delta provides one or more differences between a database catalog of the source system, and a database catalog of the target system.

17. The system of claim 15, wherein the data delta provides one or more differences between data stored in a database of the source system, and data stored in a database of the target system.

18. The system of claim 15, wherein completing migration to the target system based on the data delta comprises:
migrating data of the source system indicated by the data delta to the target system;
determining a final catalog delta; and
executing one or more final extraction steps that are provided based on the final catalog delta.

19. The system of claim 18, wherein completing migration to the target system based on the data delta further comprises applying updates indicated by the data delta to data stored in the target system.

20. The system of claim 15, wherein the completion time is determined based on one or more of data of the source system, and at least one update to data stored in the target system, as indicated by the data delta.

* * * * *